(12) United States Patent
Aoe et al.

(10) Patent No.: US 9,393,764 B2
(45) Date of Patent: Jul. 19, 2016

(54) AUTOMOBILE FUEL TANK

(71) Applicant: FTS CO., LTD., Toyota (JP)

(72) Inventors: Ryuta Aoe, Toyota (JP); Hiroyuki Tanaka, Toyota (JP); Kazuaki Naito, Toyota (JP); Hisamitsu Kato, Toyota (JP); Hisayuki Iwai, Toyota (JP); Yoshiro Umemoto, Toyota (JP); Katsuhiro Kajikawa, Toyota (JP)

(73) Assignees: FTS CO., LTD., Toyota-shi, Aichi (JP); TOYOTA JIDOSHA KABUSHIKI KAISHA, Toyota, Aichi Prefecture (JP)

( * ) Notice: Subject to any disclaimer, the term of this patent is extended or adjusted under 35 U.S.C. 154(b) by 125 days.

(21) Appl. No.: 14/238,446

(22) PCT Filed: Dec. 25, 2012

(86) PCT No.: PCT/JP2012/083489
§ 371 (c)(1),
(2) Date: Feb. 11, 2014

(87) PCT Pub. No.: WO2013/099873
PCT Pub. Date: Jul. 4, 2013

(65) Prior Publication Data
US 2014/0197175 A1    Jul. 17, 2014

(30) Foreign Application Priority Data

Dec. 27, 2011    (JP) ................................ 2011-285472

(51) Int. Cl.
*B32B 27/30* (2006.01)
*B32B 27/32* (2006.01)
*B32B 7/12* (2006.01)
*B32B 27/08* (2006.01)
*B32B 1/02* (2006.01)
(Continued)

(52) U.S. Cl.
CPC ................. *B32B 27/306* (2013.01); *B32B 1/02* (2013.01); *B32B 7/12* (2013.01); *B32B 27/08* (2013.01);
(Continued)

(58) Field of Classification Search
CPC ........ B32B 27/306; B32B 27/32; B32B 1/02; Y10T 428/1379; Y10T 428/1383; Y10T 428/31855; Y10T 428/31909; Y10T 428/3192
See application file for complete search history.

(56) References Cited

U.S. PATENT DOCUMENTS 6,737,132 B1 * 5/2004 Michihata ................. B32B 1/02
                                                             220/562
8,105,528 B2 * 1/2012 Aoki ................... B29C 49/4242
                                                             264/515
(Continued)

FOREIGN PATENT DOCUMENTS

JP    H07-101433 A    4/1995
JP    2008-024729 A    2/2008
(Continued)

OTHER PUBLICATIONS

International Search Report in PCT/JP2012/083489 dated Apr. 2, 2013 (English Translation Thereof).

*Primary Examiner* — Walter B Aughenbaugh
(74) *Attorney, Agent, or Firm* — McGinn IP Law Group PLLC

(57) ABSTRACT

An automobile fuel tank includes an outer wall including a main body of a multiple-layered synthetic resin, in which the outer wall includes at least an outer body layer, an outer adhesive layer, a barrier layer, an inner adhesive layer, and an inner body layer. The outer body layer and the inner body layer include a high density polyethylene (HDPE) as a main ingredient. Each of the outer adhesive layer and the inner adhesive layer includes a synthetic resin having adhesiveness against both the high density polyethylene (HDPE) and the barrier layer. The barrier layer includes a synthetic resin.

18 Claims, 1 Drawing Sheet

(51) Int. Cl.
*C08L 23/06* (2006.01)
*B60K 15/03* (2006.01)
*C08F 110/02* (2006.01)

(52) U.S. Cl.
CPC ............... *B32B 27/308* (2013.01); *B32B 27/32* (2013.01); *B60K 15/03177* (2013.01); *C08L 23/06* (2013.01); *B32B 2250/05* (2013.01); *B32B 2250/246* (2013.01); *B32B 2270/00* (2013.01); *B32B 2272/00* (2013.01); *B32B 2307/3065* (2013.01); *B32B 2307/538* (2013.01); *B32B 2307/54* (2013.01); *B32B 2307/558* (2013.01); *B32B 2307/72* (2013.01); *B32B 2307/7265* (2013.01); *B32B 2307/734* (2013.01); *B32B 2307/738* (2013.01); *B32B 2605/08* (2013.01); *B60K 2015/03046* (2013.01); *C08F 110/02* (2013.01)

(56) References Cited

U.S. PATENT DOCUMENTS

| | | | |
|---|---|---|---|
| 8,608,011 B2 * | 12/2013 | Asahara | B60K 15/03177 220/501 |
| 8,608,012 B2 * | 12/2013 | Aoki | B29C 49/20 220/562 |
| 2009/0000686 A1 | 1/2009 | Tsutsumi et al. | |
| 2011/0226777 A1 * | 9/2011 | Asahara | B60K 15/03177 220/562 |

FOREIGN PATENT DOCUMENTS

| | | |
|---|---|---|
| JP | 2008-114819 A | 5/2008 |
| JP | 2009-006858 A | 1/2009 |
| JP | 2009-155492 A | 7/2009 |

* cited by examiner

AUTOMOBILE FUEL TANK

TECHNICAL FIELD

The present invention relates to a fuel tank made of a thermoplastic synthetic resin and, more particularly, to a fuel tank of which a main body is formed by blow molding of a synthetic resin member composed of a multiple synthetic resin layers.

BACKGROUND ART

Conventionally, metallic fuel tanks have been used for automobiles, etc., but, in recent years, fuel tanks made of thermoplastic synthetic resins have been used, because they can reduce the weight of vehicles, no rust is generated therein, and they can be readily formed into desired configurations.

Automobile fuel tanks made of synthetic resins have been frequently formed by blow molding, because tubular bodies can be readily formed thereby. Upon blow molding, a parison of a molten thermoplastic synthetic resin is extruded from an upper side of a mold into a cylindrical configuration, and air is blown into the parison while holding the same with the mold, thereby forming the automobile fuel tanks.

In this blow molding method, in order to prevent the permeation of fuel oil while ensuring the strength of the fuel tank, the parison is formed to have a multi-layered structure. This multi-layered structure has at least a resin layer exhibiting shock resistance, which is adapted to ensure the strength of the fuel tank, another resin layer exhibiting barrier properties, which is adapted to prevent the permeation of the fuel oil, and a bonding layer adapted to bond these two kinds of resin layers to each other (see Patent document 1, for example.).

In this case, a main body of the fuel tank includes an outer body layer and an inner body layer, each being composed of a high-density polyethylene (HDPE) exhibiting a strength required for the fuel tank along with fuel resistance, and an intermediate layer composed of a thermoplastic synthetic resin is provided therebetween as a barrier layer adapted to prevent the permeation of fuel (see Patent document 2, for example.).

And, in recent years, in order to improve fuel efficiency of automobiles for protecting the environment, the weight of vehicles has been reduced.

It is necessary to reduce the weight of the automobile fuel tank made of a synthetic resin, too. In this case, the thickness of an outer wall of the synthetic resin fuel tank must be decreased while ensuring a sufficient volume for accommodating fuel. But, where only the thickness of the outer wall of the fuel tank is decreased, the deformation amount of the fuel tank may be increased and the heat resistance may be lowered if the internal pressure of the fuel tank is elevated.

On the other hand, in order to make the outer wall of the fuel tank thin, the parison used upon blow molding must be formed thin, but, the thin parison may break in the blow-up step of blowing air in an interior of the parison to expand the same. Therefore, in order to prevent the parison from breaking in the blow-up step, severe adjustment of the blow molding condition is needed so that the molding of the fuel tank becomes difficult.

Under the above circumstances, various kinds of polyethylene, each exhibiting high rigidity and excellent durability, have been proposed (see Patent document 3, for example.). However, the blow molding conditions such as blow moldability, deformation-suppressing properties of the fuel tank, etc. have not been sufficiently satisfied.

CITATION LIST

Patent Literature

PTL 1: publication of unexamined Japanese patent application No. 2009-6858
PTL 2: publication of unexamined Japanese patent application No. H07-101433
PTL 3: publication of unexamined Japanese patent application No. 2008-24729

SUMMARY OF INVENTION

Technical Problem

Accordingly, it is an object of the present invention to provide a fuel tank having excellent blow moldability, high deformation-suppressing properties and high heat resistance.

Solution to Problem

According to the present invention as set forth in claim 1, in order to solve the above-described object, in an automobile fuel tank having an outer wall composed of a main body of a multiple synthetic resin layers, the outer wall includes at least an outer body layer, an outer adhesive layer, a barrier layer, an inner adhesive layer, and an inner body layer so as to be arranged in this order from an exterior side of the outer wall, the outer body layer and the inner body layer are formed using a high-density polyethylene (HDPE) as a main ingredient, wherein the high-density polyethylene (HDPE) has:
 (1) a modulus of elasticity of 1100 to 1400 MPa at 23° C.,
 (2) a modulus of elasticity of 340 to 430 MPa at 65° C.,
 (3) a modulus of elasticity of 400 to 510 MPa at 23° C. after being immersed in Fuel D for 200 hours at 65° C.,
 (4) a Charpy impact strength of 7 to 14 kJ/m$^2$ at −40° C.,
 (5) a full-notch creep test (FNCT) result of 50 to 430 hours at 80° C.,
 (6) a melt flow rate (MRF) result of 4 to 6 (g/10 minutes) at 190° C. and a load of 21.6 kg, and
 (7) a melt tension of 18 to 25 g when a sample that has been melted at 210° C. is extruded from a nozzle with a diameter of 2.095 mm and a length of 8 mm at an extrusion rate of 15 mm/minute, and drawn at a take-up speed of 7.5 m/minute, the outer adhesive layer and the inner adhesive layer are composed of a synthetic resin exhibiting adhesiveness against both the high density polyethylene (HDPE) and the barrier layer, and the barrier layer is composed of a synthetic resin through which fuel oil is hard to permeate.

In the present invention as set forth in claim 1, the outer wall includes at least an outer body layer, an outer adhesive layer, a barrier layer, an inner adhesive layer, and an inner body layer, which are arranged in this order from the exterior side of the outer wall. With this arrangement, these layers are laminated so that the performance such as fuel permeation prevention properties, rigidity, and impact resistance is satisfied, the bonding of these layers is strengthened, and the entire wall thickness is reduced to ensure the volume of the fuel tank, and prevent the weight increase thereof.

The outer body layer and the inner body layer are formed using a high-density polyethylene (HDPE) as a main ingredient, wherein the high-density polyethylene (HDPE) has (1) a modulus of elasticity of 1100 to 1400 MPa at 23° C.,
(2) a modulus of elasticity of 340 to 430 MPa at 65° C.,
(3) a modulus of elasticity of 400 to 510 MPa at 23° C. after being immersed in Fuel D for 200 hours at 65° C.,
(4) a Charpy impact strength of 7 to 14 kJ/m$^2$ at −40° C.,
(5) a full-notch creep test (FNCT) result of 50 to 300 hours at 80° C.,
(6) a melt flow rate (MRF) result of 4 to 6 (g/10 minutes) at 190° C. and a load of 21.6 kg, and
(7) a melt tension of 18 to 25 g when a sample that has been melted at 210° C. is extruded from a nozzle with a diameter of 2.095 mm and a length of 8 mm at an extrusion rate of 15 mm/minute, and drawn at a take-up speed of 7.5 m/minute.

The outer body layer and the inner body layer are formed using a high-density polyethylene (HDPE) as a main ingredient, wherein the high-density polyethylene (HDPE) has the modulus of elasticity described in the above properties (1) to (3). Therefore, the fuel tank has a predetermined modulus of elasticity at a normal temperature or an elevated temperature, thereby satisfying such performance as rigidity and impact resistance, and where the internal pressure increases, the deformation amount of the fuel tank decreases. In addition, where fuel is permeated in the inner body layer, the rigidity of the fuel tank is ensured.

The high-density polyethylene (HDPE) has a Charpy impact strength of 7 to 14 kJ/m$^2$ at −40° C. Therefore, where the fuel tank is exposed to a lower temperature, the impact resistance of the fuel tank is ensured.

The high density polyethylene (HDPE) has a full-notch creep test (FNCT) result of 50 to 300 hours at 80° C. Therefore, where the fuel tank is exposed to repeated changes of the internal pressure thereof, or exposed to road surface vibrations generated during travelling, the fatigue durability of the fuel tank is ensured.

The high-density polyethylene (HDPE) has a melt flow rate (MRF) result of 4 to 6 (g/10 minutes) at 190° C. and a load of 21.6 kg. Therefore, the parison can be extruded smoothly upon blow-molding to make the impact resistance of the fuel tank good. Even where the fuel tank is exposed to an elevated temperature, the viscosity upon melted is high so that the outer wall is hard to be deformed, and holes are hard to be opened in the outer wall, thereby exhibiting excellent fire resistance.

The high-density polyethylene (HDPE) has a melt tension of 18 to 25 g when a sample that has been melted at 210° C. is extruded from a nozzle with a diameter of 2.095 mm and a length of 8 mm at an extrusion rate of 15 mm/minute, and drawn at a take-up speed of 7.5 m/minute. As a result, molecules of the high-density polyethylene (HDPE) are greatly entangled with each other so that the high-density polyethylene (HDPE) extruded as the parison upon blow-molding is hard to be deformed so that the parison becomes difficult to be broken upon blowing-up, whereby the adjustment of the blow molding condition upon blowing-up is facilitated to make the blow molding easy.

The outer adhesive layer and the inner adhesive layer are composed of a synthetic resin exhibiting adhesiveness against both the high-density polyethylene (HDPE) and the barrier layer. Therefore, the outer adhesive layer and the inner adhesive layer respectively bond the barrier layer, the outer body layer and the inner body layer strongly, whereby the layers of the fuel tank can be bonded strongly and become integral so that the impermeability to fuel along with the strength of the fuel tank are ensured.

The barrier layer is composed of a synthetic resin that is hard to be permeated with a fuel oil so that the fuel infiltrated into the inner body layer can be prevented from permeating and infiltrating into the outer body layer to evaporate outwardly of the vehicle body.

According to the present invention as set forth in claim 2, the outer wall of the automobile fuel tank has a skin layer formed of the high-density polyethylene (HDPE) having the physical properties (1) to (7) on an exterior side of the outer body layer.

In the present invention as set forth in claim 2, since the outer wall has a skin layer formed of the high-density polyethylene (HDPE) having the physical properties (1) to (7) on an exterior side of the outer body layer, the surface of the outer wall can be made smooth if any recycled material is mixed in the outer body layer. Since both the skin layer and the outer body layer contain the high-density polyethylene (HDPE), they have excellent adhesion properties, thereby improving the strength of the fuel tank.

According to the present invention as set forth in claim 3, the entire thickness of the outer wall of the automobile fuel tank ranges from 3.0 to 5.0 mm.

In the present invention as set forth in claim 3, since the entire thickness of the outer wall of the fuel tank ranges from 3.0 to 5.0 mm, the entire weight of the fuel tank can be reduced, as compared with the conventional fuel tanks, and since the high-density polyethylene (HDPE) as set forth in claim 1 is used, the outer wall can exhibit sufficient rigidity, and ensure sufficient impact resistance and fatigue durability.

According to the present invention as set forth in claim 4, the barrier layer of the automobile fuel tank is formed of an ethylene-vinyl alcohol copolymer (EVOH).

In the present invention as set forth in claim 4, since the barrier layer is formed of ethylene-vinyl alcohol copolymer (EVOH), it has excellent impermeability to gasoline, and can be formed by melt molding to exhibit excellent workability. In addition, it has excellent impermeability at a high humidity, or to gasoline containing alcohol.

According to the present invention as set forth in claim 5, the outer body layer of the automobile fuel tank contains a modified polyethylene or a soft polyethylene.

In the present invention as set forth in claim 5, since the outer body layer contains a modified polyethylene or a soft polyethylene, the compatibility of the high-density polyethylene (HDPE) with the ethylene-vinyl alcohol copolymer (EVOH) as the material of the barrier layer is improved if the outer body layer contains a recycled material of the fuel tank, thereby improving the impact resistance of the outer body layer.

According to the present invention as set forth in claim 6, the main body of the automobile fuel tank is formed by blow molding.

In the present invention as set forth in claim 6, since the main body of the fuel tank is formed by blow molding, a tubular fuel tank composed of a multiple-layered synthetic resin layer can be molded by one molding, whereby the configuration of the fuel tank can be freely selected.

Advantageous Effects of Invention

The skin layer, the outer body layer and the inner body layer are formed of the high-density polyethylene (HDPE) having the physical properties disclosed in (1) to (7) as a main ingredient, and since the high-density polyethylene (HDPE) has a prescribed modulus of elasticity, the fuel tank has a prescribed rigidity at a normal temperature, at a high temperature or when fuel permeates the outer wall, whereby the deformation amount of the fuel tank decreases where the internal pressure thereof increases.

The high-density polyethylene (HDPE) has a prescribed Charpy impact strength so that the fuel tank is excellent in impact resistance at a low temperature.

The high-density polyethylene (HDPE) has a prescribed full-notch creep test (FNCT) result so that the fuel tank is excellent in fatigue durability.

The high-density polyethylene (HDPE) has a prescribed melt flow rate (MRF) result so that the viscosity in a molten state is great, and consequently, the outer wall is hard to deform, and holes are hard to be formed so that the fire resistance is excellent.

The high-density polyethylene (HDPE) has a prescribed melt tension so that molecules of the high-density polyethylene (HDPE) are greatly entangled with each other, and consequently, the high-density polyethylene (HDPE) extruded as a parison upon blow molding is hard to deform, whereby the parison is prevented from breaking upon blowing-up so that the adjustment of the blow molding condition upon blowing-up becomes easy to facilitate the molding of the fuel tank.

DESCRIPTION OF EMBODIMENTS

Figure 1:
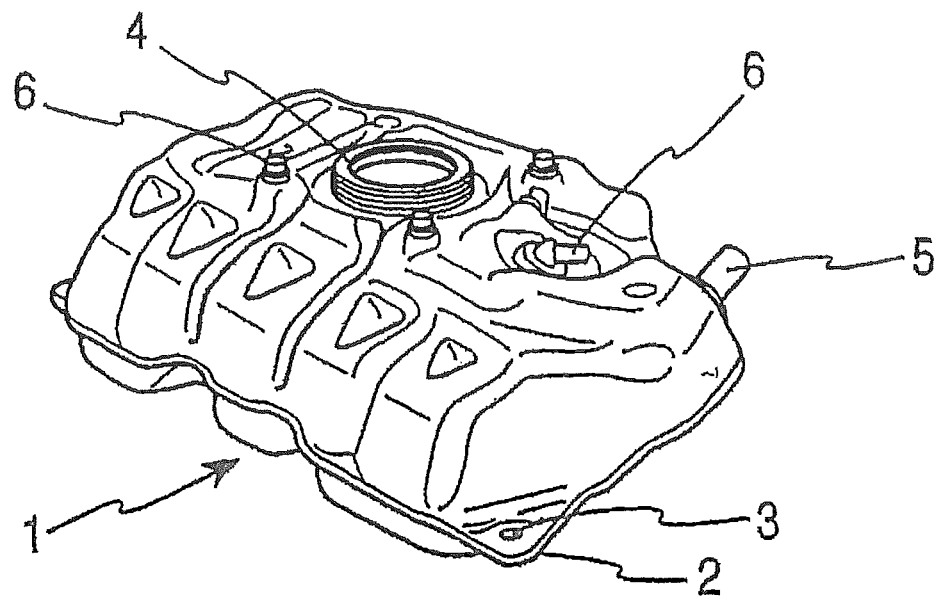
FIG. 1 is a perspective view of one embodiment of a fuel tank in accordance with the present invention.
Figure 2:
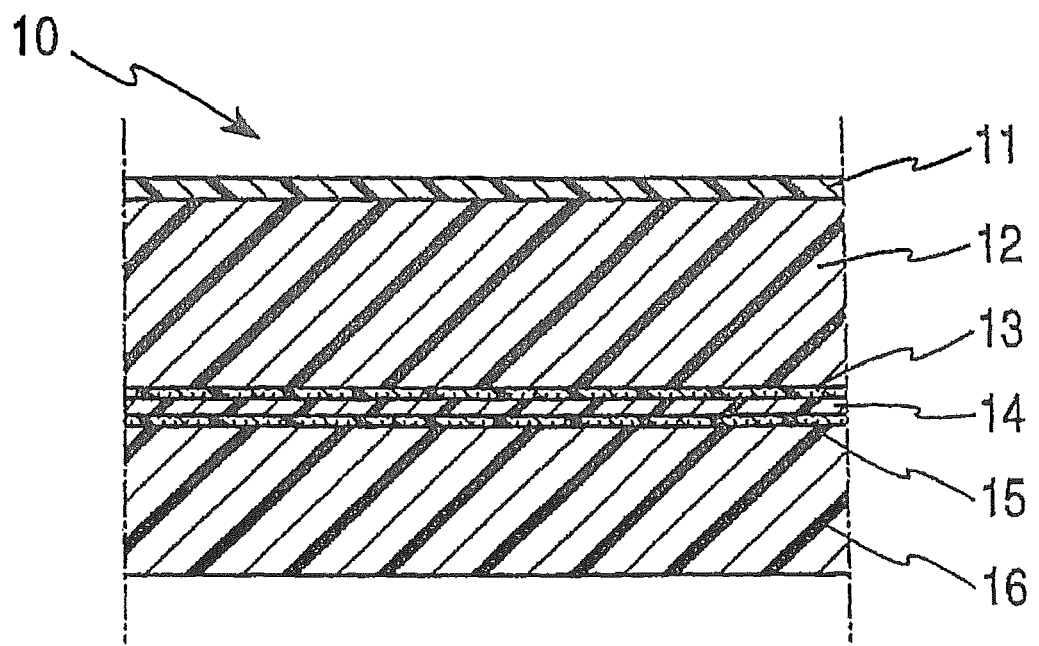
FIG. 2 is a partially enlarged sectional view showing the structure of an outer wall of a fuel tank in accordance with the present invention.

Hereinafter, one embodiment of an automobile fuel tank 1 in accordance with the present invention will be explained with reference to FIG. 1 and FIG. 2. FIG. 1 is a perspective view of one embodiment of a fuel tank 1 in accordance with the present invention, and FIG. 2 is a partially sectional view of an outer wall 10 of a fuel tank 1 made of a synthetic resin, which shows a multi-layered structure of the outer wall 10.

In accordance with one embodiment of the present invention, as shown in FIG. 1, the fuel tank 1 has a pump unit attaching hole 4 through which a fuel pump (not shown), etc. are adapted to be inserted in and removed from the fuel tank 1 in an upper surface thereof. And a fuel injection hole 5 is provided in a side surface or the upper surface of the fuel tank 1 for injecting fuel from an inlet pipe (not shown).

And an outer circumferential rib 2 is formed around the fuel tank 1 over the entire circumference thereof, and a plurality of mounting holes 3 are formed in the outer circumferential rib 2 in predetermined positions such as corners, etc. thereof. By bolting the mounting holes 3 and a vehicle body together, the fuel tank 1 is mounted on the vehicle body.

In addition, attaching ports 6 are formed in the upper surface of the fuel tank 1 for connecting a hose, etc. adapted to collect evaporated fuel from an interior of the fuel tank, etc. thereto.

In the present embodiment, the fuel tank 1 is formed by blow molding. As shown in FIG. 2, the outer wall 10 of the fuel tank 1 includes a skin layer 11, an outer body layer 12, an outer adhesive layer 13, a barrier layer 14, an inner adhesive layer 15 and an inner body layer 16 which are formed in order from an exterior side thereof. Upon blow molding, a parison composed of the above-described six layers is used. A parison composed of more than six layers can be also used.

There is the case where the skin layer 11 is not used. But, where the skin layer 11 is used, it is formed of a thermoplastic synthetic resin having a great impact resistance and keeping rigidity against fuel oil, and is preferably formed of a high-density polyethylene (HDPE). Where the outer body layer 12 contains a recycled material, the surface of the outer body layer 12 is covered with the skin layer 11 so as to prevent the exposure of the recycled material, and consequently, the surface of the outer body layer 12 can be made smooth.

The high-density polyethylene (HDPE) for use in the skin layer 11, the outer body layer 12, and the inner body layer 16 can be composed of a polyethylene having the following physical properties (1) through (7).

The high-density polyethylene (HDPE) has, (1) a modulus of elasticity of 1100 to 1400 MPa at 23° C., (2) a modulus of elasticity of 340 to 430 MPa at 65° C., (3) a modulus of elasticity of 400 to 510 MPa at 23° C. after being immersed in Fuel D for 200 hours at 65° C., (4) a Charpy impact strength of 7 to 14 kJ/m$^2$ at −40° C., (5) a full-notch creep test (FNCT) result of 50 to 300 hours at 80° C., (6) a melt flow rate (MRF) result of 4 to 6 (g/10 minutes) at 190° C. and a load of 21.6 kg, and (7) a melt tension of 18 to 25 g when a sample that has been melted at 210° C. is extruded from a nozzle with a diameter of 2.095 mm and a length of 8 mm at an extrusion rate of 15 mm/minute, and drawn at a take-up speed of 7.5 m/minute.

In this case, the physical property (1) that is a modulus of elasticity of 1100 to 1400 MPa at 23° C. means the bending modulus of elasticity in accordance with JISK7171, which is measured in an atmosphere at 23° C.

And the physical property (2) that is a modulus of elasticity of 340 to 430 MPa at 65° C. means the bending modulus of elasticity in accordance with JISK7171, which is measured in an atmosphere at 65° C.

The high-density polyethylene (HDPE) for use in the present invention has the above-described modulus of elasticity, and has a modulus of elasticity of 1100 to 1400 MPa at a normal temperature, which is high, so that when the thickness of the outer wall 10 of the fuel tank 1 is decreased, it can exhibit a sufficient rigidity, and consequently, when the internal pressure of the fuel tank 1 is elevated, the deformation amount of the fuel tank 1 can be decreased. When the modulus of elasticity of the high-density polyethylene (HDPE) exceeds 1400 MPa, the impact resistance lowers, whereas when the modulus of elasticity is less than 1100 MPa, the rigidity of the fuel tank 1 lowers.

In addition, since the modulus of elasticity of the high-density polyethylene (HDPE) is 340 to 430 MPa at 65° C., the fuel tank 1 can have a sufficient rigidity at a high temperature so that the deformation of the fuel tank 1 can be decreased. When the modulus of elasticity of the high-density polyethylene (HDPE) exceeds 430 MPa at 65° C., the impact resistance at a high temperature lowers, whereas when the modulus of elasticity of the high-density polyethylene (HDPE) is less than 340 MPa at 65° C., the rigidity of the fuel tank 1 lowers at a high temperature.

And, the physical property (3) that is a modulus of elasticity of 400 to 510 MPa at 23° C. after being immersed in Fuel D for 200 hours at 65° C. is obtained by immersing test pieces in Fuel D (copper ion: 0.1 PPM, peroxide valence: 200 mg/kg), keeping them at 65° C. for 200 hours, and measuring the bending modulus of elasticity in accordance with JISK7171 in an atmosphere of 23° C. In this case, Fuel D is prepared by composing isooctane and toluene in the ratio of 40 to 60.

Consequently, it can have a sufficient rigidity even in so-called sour gasoline (degradation gasoline). When the high-density polyethylene (HDPE) exceeds 510 MPa, the impact resistance lowers upon swelling, whereas when the high-density polyethylene (HDPE) is less than 400 MPa, the rigidity of the fuel tank 1 lowers upon swelling.

The physical property (4) that is the Charpy impact strength of 7 to 14 kJ/m² at −40° C. means the Charpy impact strength in accordance with JIS-K7111-2 (2006), which is measured in an atmosphere at −40° C. Therefore, when the thickness of the outer wall 10 of the fuel tank 1 is decreased, or the outer wall 10 of the fuel tank 1 is exposed to a low temperature, it can have a sufficient impact resistance. Where the Charpy impact strength of the high-density polyethylene (HDPE) is less than 7 kJ/m², the impact resistance of the fuel tank 1 lowers at a low temperature, and where the Charpy impact strength of the high-density polyethylene (HDPE) exceeds 14 kJ/m², another physical property that is MFR (melt flow rate) excessively lowers so that the molding of the fuel tank 1 becomes difficult, which is less preferable.

The physical property (5) that is the full-notch creep test (FNCT) result of 50 to 300 hours at 80° C. is the result of the full-notch creep test (FNCT) in accordance with JIS-K6774 (2005) Annex 4, which is measured in an atmosphere at 80° C. Therefore, where the thickness of the outer wall 10 of the fuel tank 1 is decreased, or the fuel tank 1 is exposed to a repeated variations of the internal pressure, or road face vibrations generated during traveling, the fatigue durability of the fuel tank can be ensured. Where the full-notch creep test (FNCT) result of the high-density polyethylene (HDPE) is less than 50 hours, the fatigue durability of the fuel tank 1 lowers, and where the full-notch creep test (FNCT) result of the high-density polyethylene (HDPE) exceeds 300 hours, another physical property that is the bending modulus of elasticity excessively decreases so that the rigidity required for the fuel tank 1 cannot be sufficiently ensured.

The physical property (6) that is the melt flow rate (MRF) result of 4 to 6 (g/10 minutes) at 190° C. and a load of 21.6 kg is measured in accordance with JIS-K7210 (1999). In this measurement, the amount of resin is measured by putting a high-density polyethylene (HDPE) at 190° C. in an extrusion plastometer, and extruding it into a cylindrical configuration for ten minutes at a load of 21.6 kg.

When the melt flow rate (MRF) result is less than 4, the fluidity of the high-density polyethylene (HDPE) is insufficient so that the extrusion amount of the parison is short during blow molding. When the melt flow rate (MRF) result of the high-density polyethylene (HDPE) exceeds 6, the viscosity thereof is low, and the drawdown of the parison may be generated during blow molding.

The physical property (7) that is the melt tension of 18 to 25 g when a sample melted at 210° C. is extruded from a nozzle with a diameter of 2.095 mm and a length of 8 mm at an extrusion rate of 15 mm/minute, and drawn at a take-up speed of 7.5 m/minute is obtained by measuring the tension upon extruding a resin melted at 210° C. from an orifice having a nozzle diameter of 2.095 mm and a length of 8 mm at a piston rate of 15 mm/minute, and drawing the same at a take-up speed of 7.5 m/minute.

When the melt tension of the high-density polyethylene (HDPE) is less than 18 g, the tension of the parison is insufficient upon blow molding so that drawdown of the parison may be generated. And where the melt tension of the high-density polyethylene (HDPE) exceeds 25 g, the tension of the parison becomes too large to extrude the parison, and the parison is pressed against a mold too much to mold the fuel tank.

In accordance with the present embodiment of the present invention, the average wall thickness of the outer wall 10 of the fuel tank 1 is 4.8 mm. The outer wall 10 can be formed to have a wall thickness other than 4.8 mm, but, conventionally, the average wall thickness of the outer wall 10 is frequently about 5.2 mm, and by using the high-density polyethylene (HDPE) of the present invention, the wall thickness can be decreased.

The skin layer 11, the outer body layer 12, the outer adhesive layer 13, the barrier layer 14, the inner adhesive layer 15 and the inner body layer 16 respectively have the thickness as follows:

The skin layer 11 has a thickness ranging from 10 to 14% of the entire thickness of the outer wall 10 of the fuel tank 1, that is, about 0.30 to 0.70 mm. With this arrangement, the skin layer 11 securely covers the surface of the outer wall 10. Since the skin layer 11 and the outer body layer 12 are respectively composed of a high-density polyethylene (HDPE) as a main ingredient, they can readily come into close contact with each other.

The outer body layer 12 has a thickness ranging from 40 to 50% of the entire thickness of the outer wall 10 of the fuel tank 1, that is, about 1.20 to 2.50 mm. With this arrangement, if the wall thickness of the outer wall 10 of the fuel tank 1 is decreased, the outer wall 10 composed of the high-density polyethylene (HDPE) having the above-described physical properties (1) through (7) shows an improved modulus of elasticity so as to prevent the deformation of the fuel tank 1, increase the rigidity and improve the strength of the fuel tank 1.

The outer body layer 12 can be formed using a recycled material mainly including the high-density polyethylene (HDPE) as a main ingredient. For example, as disclosed in the present invention, the recycled material mainly including the high-density polyethylene (HDPE) is prepared by pulverizing scraps and inferior goods produced during the production of the fuel tank 1 for recycling. Since the fuel tank 1 is mainly composed of the high-density polyethylene (HDPE), the recycled material obtained by pulverizing the fuel tank 1 mainly contains the high-density polyethylene (HDPE) having the above-described physical properties (1) through (7).

These recycled materials may be used in the ratio of 100% of the material of the fuel tank 1, or a newly prepared high-density polyethylene (HDPE) may be mixed with these recycled materials.

The outer body layer 12 can contain a compatibilizer such as a modified polyethylene or a soft polyethylene. The material obtained by recycling scraps, etc. produced during the production process contains ethylene vinyl alcohol copolymer (EVOH), etc. as a composition material of a barrier layer contained in the recycled material. Where the above-described recycled material is used, ethylene vinyl alcohol copolymer (EVOH) is dispersed in the high-density polyethylene (HDPE). Where the modified polyethylene or the soft polyethylene is contained, ethylene vinyl alcohol copolymer (EVOH) is micronized to be dispersed in the high-density polyethylene (HDPE), thereby improving the compatibility to enable the sufficient mixing with each other. As a result, the shock resistance can be improved.

The outer adhesive layer 13 has a thickness of 0.7 to 1.7% of an entire thickness of the outer wall 10 of the fuel tank 1, which is about 0.02 to 0.09 mm. The barrier layer 14 has a thickness of 0.7 to 1.7% of an entire thickness of the outer wall 10 of the fuel tank 1, which is about 0.02 to 0.09 mm. The inner adhesive layer 15 has a thickness of 0.7 to 1.7% of an entire thickness of the outer wall 10 of the fuel tank 1, which is about 0.02 to 0.09 mm.

With this arrangement, the barrier layer 14 can prevent the fuel permeation of the fuel tank 1, the outer adhesive layer 13 can improve the adhesive power between the barrier layer 14 and the outer body layer 12, and the inner adhesive layer 15 can improve the adhesive power between the barrier layer 14 and the inner body layer 16.

The barrier layer 14 is composed of a thermoplastic synthetic resin through which only an extremely small amount of fuel oil is permeated. Examples of the thermoplastic synthetic resin composing the barrier layer 14 include ethylene-vinyl alcohol copolymer (EVOH), polybutylene terephthalate, polyetylene terephthalate, polyphenylene sulfide (PPS), liquid crystal polymer (LCP), and semi-aromatic nylon (PPA), but ethylene-vinyl alcohol copolymer (EVOH) is preferable.

By virtue of the barrier layer 14, fuel oil such as gasoline, etc. permeated through the later described inner body layer 16 can be prevented from further permeating, whereby fuel oil can be prevented from evaporating into the air.

Where ethylene-vinyl alcohol copolymer (EVOH) is used as the barrier layer 14, it has excellent gasoline impermeability, and enables fusion molding so as to exhibit excellent workability. In addition, it also has excellent gasoline impermeability even under a high humidity condition. Furthermore, it can also have excellent impermeability against gasoline containing alcohol.

The outer adhesive layer 13 is provided between the outer body layer 12 and the barrier layer 14 to bond these two layers together, whereas the inner adhesive layer 15 is provided between the inner body layer 16 and the barrier layer 14 to bond these two layers together. The outer adhesive layer 13 and the inner adhesive layer 15 are formed from the same material that is a synthetic resin having adhesion to both the high-density polyethylene (HDPE) and the barrier layer 14. Therefore, the outer adhesive layer 13 and the inner adhesive layer 15 strongly bond the barrier layer 14, the outer body layer 12 and the inner body layer 16 to each other so that these layers are brought into integrally close contact with each other, thereby ensuring the fuel impermeability and the strength of the fuel tank 1.

Examples of the adhesive synthetic resin for use as the outer adhesive layer 13 and the inner adhesive layer 15 include modified polyolefin resins, and particularly, an unsaturated carboxylic acid modified polyethylene resin is preferable. It can be produced by copolymerization or graft polymerization of an unsaturated carboxylic acid with a polyolefin resin.

As disclosed with respect to the skin layer 11 and the outer body layer 12, the inner body layer 16 is formed from the high-density polyethylene (HDPE) that is the same material with that of the skin layer 11 and the outer body layer 12.

The inner body layer 16 has a thickness ranging from 31.5% to 45.5% of the entire thickness of the outer wall 10 of the fuel tank 1. Therefore, the thickness of the inner body layer 16 ranges from about 0.945 to about 2.28 mm.

As a result, the inner body layer 16 has a sufficient thickness so that the outer wall 10 of the fuel tank 1 can maintain its rigidity and ensure a high impact resistance even if it swells with fuel oil.

Embodiment 1 in which the high-density polyethylene (HDPE) in accordance with the present invention is used in the fuel tank 1 is compared with comparative examples 1 through 4, each using another high-density polyethylene (HDPE), and comparison results are shown in Table 1.

TABLE 1

| | | | | Embodiment | Comparative example | | | |
|---|---|---|---|---|---|---|---|---|
| | | | | 1 | 1 | 2 | 3 | 4 |
| | High-density polyethylene | | | A | B | C | D | E |
| Physical Property of material | Modulus of elasticity | 23° C. | MPa | 1200 | 1250 | 1100 | 900 | 900 |
| | | 65° C. | MPa | 370 | 400 | 350 | 280 | 280 |
| | | After swelling | MPa | 440 | 450 | 370 | 340 | 340 |
| | Charpy impact strength at −40° C. | | kJ/m² | 10 | 10 | 11 | 10 | 10 |
| | FNCT | | hr | 70 | 80 | 70 | 70 | 70 |
| | MFR | | g/10 min. | 4.5 | 5.9 | 4.2 | 6 | 6 |
| | Melt tension | | g | 23 | 15 | 21 | 20 | 20 |
| Condition of fuel tank Performance | Average thickness | | mm | 4.8 | 4.8 | 5.1 | 5.3 | 4.8 |
| | Maximum pressure deformation amount | | | 96 | 107 | 106 | 100 | 116 |
| | Side impact test entry amount | | | 98 | 104 | 105 | 100 | 121 |
| | Bottle fire resistance | Weight | g | 87 | 87 | 92 | 95 | 86 |
| | | hole-forming time | Sec. | 110 | 89 | 113 | 100 | 94 |

The maximum pressure deformation amount of the fuel tank 1 is obtained as follows:

A test fuel is enclosed in the fuel tank 1, suspended in air at a predetermined angle, and left at 65° C. The distances between several points of the fuel tank 1 and a reference point are measured to define them as zero points. Then, the test fuel is left for five minutes while applying an inner pressure, and the distances from the reference point are measured to obtain differences from the zero points to define the deformation amounts therefrom.

The obtained deformation amounts of Embodiment 1, and comparative examples 1 through 4 are disclosed in Table 1 when the obtained deformation amount of Comparative example 3 is 100. When Embodiment 1 in which the high-density polyethylene (HDPE) in accordance with the present invention is used, is compared with Comparative examples 1 through 4 in which different kinds of high-density polyethylene (HDPE), each having a different modulus of elasticity, a different melt flow rate and a different melt tension, are used, the maximum pressure deformation amount of Embodiment 1 is 96 that is smaller than that of each of Comparative examples 1 through 4 (100 through 116).

In comparative example 1, the modulus of elasticity is larger at each of 23° C., 65° C. and after swelling, but the maximum pressure deformation amount is large. This is caused by the smaller melt tension damaging the thickness uniformity of the fuel tank 1. And in Comparative examples 2 through 4, the modulus of elasticity is smaller at each of 23° C., 65° C. and after swelling so that the average pressure deformation amount is large. Consequently, the deformation amount of the fuel tank 1 containing the high-density polyethylene (HDPE) in accordance with the present invention, which has the above-described physical properties (1) through (3), is small, and preferable.

The shock resistance of the fuel tank 1 was measured as the side impact test entry amount. The fuel tank 1 was secured to a surface plate, a carriage with a predetermined weight, which had a cylinder attached to a tip end thereof was made to collide with the fuel tank 1, and the entry amount of the cylinder into the fuel tank 1 was measured.

The amounts of Embodiment 1 and Comparative examples 1 through 4 are disclosed in Table 1 where the amount of Comparative example 3 is expressed by 100.

With respect to the side impact test entry amount in the side impact test, Embodiment 1 in which the high-density polyethylene (HDPE) in accordance with the present invention is used, is compared with Comparative examples 2 through 4 in which different kinds of high-density polyethylene (HDPE), each exhibiting a different modulus of elasticity, a different melt flow rate and a different melt tension, are used. As a result, the side impact test entry amount of Embodiment 1 is 98 that is less than the amounts (100 through 121) of Comparative examples 1 through 4.

In comparative example 1, the modulus of elasticity is larger at each of 23° C., 65° C. and after swelling, but the side impact test entry amount is larger, too. This is caused by the smaller melt tension damaging the thickness uniformity of the fuel tank 1. And in Comparative examples 2 through 4, the modulus of elasticity is smaller at each of 23° C., 65° C. and after swelling, but the side impact test entry amount is larger. Consequently, the side impact test entry amount of the fuel tank 1 containing the high-density polyethylene (HDPE) in accordance with the present invention, which exhibits the above-described physical properties (1) through (3), is small, and preferable.

The bottle fire resistance test was conducted by producing bottles of 500 cc with a thickness of 2 mm from the high-density polyethylene (HDPE) of Embodiment 1 and those of Comparative examples 1 through 4, injecting water therein to a full amount thereof, and heating them with a gas burner into contact with a flame of 900° C. and about 20 mm. And the time when holes were formed was respectively measured.

Embodiment 1 in which the high-density polyethylene (HDPE) in accordance with the present invention was used, is compared with Comparative examples 1 through 4 in which different kinds of high-density polyethylene (HDPE), each exhibiting a different modulus of elasticity, a different melt flow rate and a different melt tension, were used. As a result, the hole forming time of Embodiment 1 is 110 sec. that is longer than those (89, 100, 94) of Comparative examples 1, 3, 4.

The hole forming time of Comparative example 2 is 113 sec. that is approximately the same with that of Embodiment 1, but the maximum pressure deformation amount and the side impact test entry amount thereof is inferior to those of Embodiment 1 so that Embodiment 1 generally has excellent performance superior to those of Comparative examples 1 through 4.

REFERENCE SIGNS LIST 1 fuel tank
10 outer wall
11 skin layer
12 outer body layer
13 outer adhesive layer
14 barrier layer
15 inner adhesive layer
16 inner body layer

The invention claimed is:

1. An automobile fuel tank including an outer wall comprising a main body of a multiple-layered synthetic resin,
   wherein said outer wall includes at least an outer body layer, an outer adhesive layer, a barrier layer, an inner adhesive layer, and an inner body layer, said outer body layer and said inner body layer comprising a high density polyethylene (HDPE) as a main ingredient, which has physical properties:
   (1) a modulus of elasticity of 1100 MPa to 1400 MPa at 23° C.;
   (2) a modulus of elasticity of 340 MPa to 430 MPa at 65° C.;
   (3) a modulus of elasticity of 400 MPa to 510 MPa at 23° C. after being immersed in Fuel D for 200 hours at 65° C. wherein Fuel D is prepared by composing isooctane and toluene in the ratio of 40 to 60, and Fuel D includes copper ion in an amount of 0.1 PPM and has a peroxide valence of 200 mg/kg;
   (4) a Charpy impact strength of 7 kJ/m$^2$ to 14 kJ/m$^2$ at −40° C.;
   (5) a full-notch creep test (FNCT) result of 50 hours to 300 hours at 80° C.;
   (6) a melt flow rate (MFR) result of 4 (g/10 minutes) to 6 (g/10 minutes) at 190° C. and a load of 21.6 kg; and
   (7) a melt tension of 18 g to 25 g when a sample that has been melted at 210° C. is extruded from a nozzle with a diameter of 2.095 mm and a length of 8 mm at an extrusion rate of 15 mm/min, and drawn at a take-up speed of 7.5 m/minute,
   wherein each of said outer adhesive layer and said inner adhesive layer comprises a synthetic resin having adhesiveness against both said high density polyethylene (HDPE) and said barrier layer, and
   wherein said barrier layer comprises a synthetic resin.

2. The automobile fuel tank as claimed in claim 1, wherein said outer wall includes a skin layer comprising said high-density polyethylene (HDPE) on an exterior side of said outer body layer.

3. The automobile fuel tank as claimed in claim 1, wherein an entire thickness of said outer wall of said fuel tank ranges from 3.0 mm to 5.0 mm.

4. The automobile fuel tank as claimed in claim 1, wherein said barrier layer comprises an ethylene-vinyl alcohol copolymer (EVOH).

5. The automobile fuel tank as claimed in claim 1, wherein said outer body layer comprises one of a modified polyethylene and a low density polyethylene.

6. The automobile fuel tank as claimed in claim 1, wherein said main body of said fuel tank is formed by blow molding.

7. The automobile fuel tank as claimed in claim 2, wherein an entire thickness of said outer wall of said fuel tank ranges from 3.0 mm to 5.0 mm.

8. The automobile fuel tank as claimed in claim 2, wherein said barrier layer comprises an ethylene-vinyl alcohol copolymer (EVOH).

9. The automobile fuel tank as claimed in claim 3, wherein said barrier layer comprises an ethylene-vinyl alcohol copolymer (EVOH).

10. The automobile fuel tank as claimed in claim 2, wherein said outer body layer comprises one of a modified polyethylene and a low density polyethylene.

11. The automobile fuel tank as claimed in claim 3, wherein said outer body layer comprises one of a modified polyethylene and a low density polyethylene.

12. The automobile fuel tank as claimed in claim 4, wherein said outer body layer comprises one of a modified polyethylene and a low density polyethylene.

13. The automobile fuel tank as claimed in claim 2, wherein said main body of said fuel tank is formed by blow molding.

14. The automobile fuel tank as claimed in claim 3, wherein said main body of said fuel tank is formed by blow molding.

15. The automobile fuel tank as claimed in claim 4, wherein said main body of said fuel tank is formed by blow molding.

16. The automobile fuel tank as claimed in claim 5, wherein said main body of said fuel tank is fanned by blow molding.

17. An automobile fuel tank, including:
an outer wall comprising a main body of a multiple-layered synthetic resin,
wherein said outer wall includes at least an outer body layer, an outer adhesive layer, a barrier layer, an inner adhesive layer, and an inner body layer, said outer body layer and said inner body layer comprising a high density polyethylene (HDPE) as a main ingredient,
wherein each of said outer adhesive layer and said inner adhesive layer comprises a synthetic resin having adhesiveness against both said high density polyethylene (HDPE) and said barrier layer, and
wherein said barrier layer comprises and an ethylene-vinyl alcohol copolymer (EVOH)
wherein said high density polyethylene (HDPE) has physical properties of:
(1) a modulus of elasticity of 1100 to 1400 MPa at 23° C.;
(2) a modulus of elasticity of 340 to 430 MPa at 65° C.;
(3) a modulus of elasticity of 400 to 510 MPa at 23° C. after being immersed in Fuel D for 200 hours at 65° C. after being immersed in Fuel D for 200 hours at 65° C., wherein Fuel D is prepared by composing isooctane and toluene in the ratio of 40 to 60, and Fuel D includes copper ion in an amount of 0.1 PPM and has a peroxide valence of 200 mg/kg;
(4) a Charpy impact strength of 7 to 14 kJ/m$^2$ at −40° C.;
(5) a full-notch creep test (FNCT) result of 50 to 300 hours at 80° C.;
(6) a melt flow rate (MFR) result of 4 (g/10 minutes) to 6 (g/10 minutes) at 190° C. and a load of 21.6 kg.

18. An automobile fuel tank, including:
an outer wall comprising a main body of a multiple-layered synthetic resin,
wherein said outer wall includes at least an outer body layer, an outer adhesive layer, a barrier layer, an inner adhesive layer, and an inner body layer, said outer body layer and said inner body layer comprising a high density polyethylene (HDPE) as a main ingredient,
wherein each of said outer adhesive layer and said inner adhesive layer comprises a synthetic resin having adhesiveness against both said high density polyethylene (HDPE) and said barrier layer,
wherein said barrier layer comprises a synthetic resin,
wherein said outer wall includes a skin layer comprising said high-density polyethylene (HDPE) on an exterior side of said outer body layer, and
wherein said outer body layer comprises one of a modified polyethylene and polyethylene,
wherein said high density polyethylene (HDPE) has physical properties of:
(1) a modulus of elasticity of 1100 to 1400 MPa at 23° C.;
(2) a modulus of elasticity of 340 to 430 MPa at 65° C.;
(3) a modulus of elasticity of 400 to 510 MPa at 23° C. after being immersed in Fuel D for 200 hours at 65° C. after being immersed in Fuel D for 200 hours at 65° C., wherein Fuel D is prepared by composing isooctane and toluene in the ratio of 40 to 60, and Fuel D includes copper ion in an amount of 0.1 PPM and has a peroxide valence of 200 mg/kg;
(4) a Charpy impact strength of 7 to 14 kJ/m$^2$ at −40° C.;
(5) a full-notch creep test (FNCT) result of 50 to 300 hours at 80° C.;
(6) a melt flow rate (MFR) result of 4 (g/10 minutes) to 6 (g/10 minutes) at 190° C. and a load of 21.6 kg.

* * * * *